(12) United States Patent
Li

(10) Patent No.: US 10,133,606 B2
(45) Date of Patent: Nov. 20, 2018

(54) APPLICATION SCALING MANAGEMENT METHOD AND APPARATUS THAT USES DISTANCES BETWEEN DATA CENTERS AND NETWORK RESOURCES OF DATA CENTERS TO SELECT A DATA CENTER FOR EXPANSION

(71) Applicant: Huawei Technologies Co., Ltd., Shenzhen (CN)

(72) Inventor: Xinlong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 15/336,184

(22) Filed: Oct. 27, 2016

(65) Prior Publication Data

US 2017/0046204 A1    Feb. 16, 2017

Related U.S. Application Data

(63) Continuation of application No. PCT/CN2015/083381, filed on Jul. 6, 2015.

(30) Foreign Application Priority Data

Oct. 17, 2014  (CN) .................... 2014 1 0554672

(51) Int. Cl.
*G06F 9/46*  (2006.01)
*G06F 9/50*  (2006.01)
(Continued)

(52) U.S. Cl.
CPC ........ *G06F 9/5061* (2013.01); *G06F 9/44505* (2013.01); *G06F 9/45533* (2013.01);
(Continued)

(58) Field of Classification Search
None
See application file for complete search history.

(56) References Cited

U.S. PATENT DOCUMENTS 9,184,981 B2 * 11/2015 Sarikaya ........... H04L 29/08153
2004/0117476 A1   6/2004 Steele et al.
(Continued)

FOREIGN PATENT DOCUMENTS

CN   103051564 A    4/2013
CN   103309723 A    9/2013
(Continued)

OTHER PUBLICATIONS

Alicherry, M., et al., "Network Aware Resource Allocation in Distributed Clouds," XP032179208, Proceedings IEEE INFOCOM, Mar. 25, 2012, pp. 963-971.
(Continued)

*Primary Examiner* — Wissam Rashid
(74) *Attorney, Agent, or Firm* — Conley Rose, P.C.

(57) ABSTRACT

An application scaling management method and apparatus are disclosed, so as to perform, in a case in which an application requires capacity expansion and remaining resources of a data center in which the application runs are insufficient, capacity expansion of the application by utilizing remaining resources of another data center, thereby improving resource utilization and capacity expansion efficiency.

20 Claims, 5 Drawing Sheets

(51) Int. Cl.
*G06F 9/455* (2018.01)
*G06F 9/445* (2018.01)

(52) U.S. Cl.
CPC ........ *G06F 9/45558* (2013.01); *G06F 9/5005* (2013.01); *G06F 9/505* (2013.01); *G06F 9/5077* (2013.01); *G06F 9/5083* (2013.01); *G06F 9/5088* (2013.01); *G06F 2009/4557* (2013.01); *G06F 2009/45562* (2013.01); *G06F 2209/503* (2013.01)

(56) References Cited

U.S. PATENT DOCUMENTS

| | | | | |
|---|---|---|---|---|
| 2009/0144393 | A1* | 6/2009 | Kudo | G06F 9/5044 709/218 |
| 2011/0075664 | A1* | 3/2011 | Lambeth | H04L 45/04 370/390 |
| 2012/0297238 | A1* | 11/2012 | Watson | G06F 9/5088 714/4.11 |
| 2014/0325515 | A1* | 10/2014 | Salmela | G06F 9/4856 718/1 |

FOREIGN PATENT DOCUMENTS

| | | |
|---|---|---|
| CN | 103443771 A | 12/2013 |
| CN | 103547994 A | 1/2014 |
| CN | 104317638 A | 1/2015 |
| EP | 2570922 A1 | 3/2013 |

OTHER PUBLICATIONS

Calcavecchia, N., et al., "VM Placement Strategies for Cloud Scenarios," XP032215377, IEEE Fifth International Conference on Cloud Computing, Jun. 24, 2012, 8 pages.
Zhang, B., et al., "Minimizing Communication Traffic in Data Centers with Power-Aware VM Placement," XP032234721, Sixth International Conference on Innovative Mobile and Internet Services in Ubiquitous Computing, Jul. 4, 2012, 6 pages.
Wang, W., et al., "An Availability-aware Virtual Machine Placement Approach for Dynamic Scaling of Cloud Application," XP032255135, 9th International Conference on Ubiquitous Intelligence and Computing and 9th International Conference on Autonomic and Trusted Computing, Sep. 4, 2012, 8 pages.
Adami, D., et al., "Effective resource control strategies using Openflow in cloud data center," XP032445677, May 27, 2013, pp. 568-574.
Foreign Communication From a Counterpart Application, European Application No. 15851132.9, Extended European Search Report dated May 18, 2017, 15 pages.
Partial English Translation and Abstract of Chinese Patent Application No. CN104317638, Jan. 28, 2015, 4 pages.
Partial English Translation and Abstract of Chinese Patent Application No. CN103051564, Apr. 17, 2013, 11 pages.
Foreign Communication From a Counterpart Application, Chinese Application No. 201410554672.7, Chinese Office Action dated Jan. 25, 2017, 7 pages.
Foreign Communication From a Counterpart Application, PCT Application No. PCT/CN2015/083381, English Translation of International Search Report dated Sep. 28, 2015, 2 pages.

* cited by examiner

APPLICATION SCALING MANAGEMENT METHOD AND APPARATUS THAT USES DISTANCES BETWEEN DATA CENTERS AND NETWORK RESOURCES OF DATA CENTERS TO SELECT A DATA CENTER FOR EXPANSION

CROSS-REFERENCE TO RELATED APPLICATIONS

This application is a continuation of International Application No. PCT/CN2015/083381, filed on Jul. 6, 2015, which claims priority to Chinese Patent Application No. 201410554672.7, filed on Oct. 17, 2014. The disclosures of the aforementioned applications are hereby incorporated by reference in their entireties.

TECHNICAL FIELD

The present disclosure relates to the field of communications technologies, and in particular, to an application scaling management method and apparatus.

BACKGROUND

At present, with widespread development of informatization, an enterprise may own a plurality of cloud data centers, and resource consumption of data centers (DC) may be unbalanced. For example, resources in a data center A are exhausted, but a data center B still has a large quantity of remaining resources.

It is assumed that an application runs in the data center A, and resources occupied by the application have an elastic scaling capability. If the application requires capacity expansion, but the resources in the data center A are exhausted, resources required for the capacity expansion of the application cannot be provided. Consequently, the capacity expansion of the application cannot be performed.

If capacity expansion is performed on the data center A when the resources in the data center A are exhausted and when an application requires capacity expansion, new computing, memory, and network devices need to be purchased. In addition, the capacity expansion process is time-consuming and resources required for the capacity expansion of the application cannot be provided in time. Moreover, the large quantity of remaining resources in the data center B cannot be utilized, and resource utilization is relatively low.

SUMMARY

The present disclosure provides an application scaling management method and apparatus, so as to perform, in a case in which an application requires capacity expansion and remaining resources of a data center in which the application runs are insufficient, capacity expansion of the application by utilizing remaining resources of another data center, thereby improving resource utilization and capacity expansion efficiency.

Specific technical solutions provided in embodiments of the present disclosure are as follows, According to a first aspect, an application scaling management method is provided, the method including obtaining a load indicator of an application that runs in a first data center, and when determining that the load indicator exceeds a preset capacity expansion threshold, calculating a resource capacity required for capacity expansion of the application, obtaining a remaining resource capacity of the first data center, and selecting a second data center from at least one candidate data center when determining that the remaining resource capacity of the first data center is not greater than the resource capacity required for the capacity expansion, where a remaining resource capacity of the second data center is greater than the resource capacity required for the capacity expansion, and creating, in the second data center, a virtual machine required for the capacity expansion of the application, establishing a network connection between the virtual machine and the first data center, and registering the virtual machine with a main control node of the application.

With reference to the first aspect, in a first possible implementation, the selecting a second data center from at least one candidate data center includes determining a data center used for historical capacity expansion of the application as the second data center when determining that the data center used for the historical capacity expansion exists in the at least one candidate data center, or selecting the second data center from the at least one candidate data center according to a distance between the first data center and each candidate data center and network bandwidth between the first data center and each candidate data center.

With reference to the first possible implementation of the first aspect, in a second possible implementation, the selecting the second data center from the at least one candidate data center according to a distance between the first data center and each candidate data center and network bandwidth between the first data center and each candidate data center includes adding up a first result that is obtained by multiplying the distance between the first data center and each candidate data center by a first coefficient and a second result that is obtained by multiplying the network bandwidth between the first data center and each candidate data center by a second coefficient, to obtain a sum value of the candidate data center, and determining a candidate data center corresponding to a maximum sum value of the sum value as the second data center.

With reference to the first aspect, in a third possible implementation, the establishing a network connection between the virtual machine and the first data center includes creating a virtual router in the second data center, creating a subnet in the virtual router, connecting the virtual machine to the subnet, and establishing the network connection between the first data center and the virtual machine using the virtual router.

With reference to the first aspect, in a fourth possible implementation, after the selecting a second data center from at least one candidate data center and before the creating, in the second data center, a virtual machine required for the capacity expansion of the application, the method further includes sending a resource reservation application to the second data center, where the resource reservation application includes a resource capacity of resources required for the capacity expansion, a resource attribute, and resource location information.

With reference to any one of the first aspect to the fourth possible implementation, in a fifth possible implementation, the method further includes when the remaining resource capacity of the first data center exceeds a back-migration threshold of the application, creating, in the first data center, a virtual machine required for a back-migration of the application, and registering the virtual machine required for the back-migration of the application with the main control node of the application, and instructing the main control node of the application not to send service data to the virtual machine in the second data center any more, and deleting the virtual machine from the second data center after determining that the virtual machine in the second data center has completed a task assigned by the main control node.

According to a second aspect, an application scaling management apparatus is provided, including a determining module configured to obtain a load indicator of an application that runs in a first data center, and when determining that the load indicator exceeds a preset capacity expansion threshold, calculate a resource capacity required for capacity expansion of the application, a selection module configured to obtain a remaining resource capacity of the first data center, and select a second data center from at least one candidate data center when determining that the remaining resource capacity of the first data center is not greater than the resource capacity required for the capacity expansion, where a remaining resource capacity of the second data center is greater than the resource capacity required for the capacity expansion, and a capacity expansion module configured to create, in the second data center, a virtual machine required for the capacity expansion of the application, establish a network connection between the virtual machine and the first data center, and register the virtual machine with a main control node of the application.

With reference to the second aspect, in a first possible implementation, the selection module is further configured to determine a data center used for historical capacity expansion of the application as the second data center when determining that the data center used for the historical capacity expansion exists in the at least one candidate data center, or select the second data center from the at least one candidate data center according to a distance between the first data center and each candidate data center and network bandwidth between the first data center and each candidate data center.

With reference to the first possible implementation of the second aspect, in a second possible implementation, the selection module is further configured to add up a first result that is obtained by multiplying the distance between the first data center and each candidate data center by a first coefficient and a second result that is obtained by multiplying the network bandwidth between the first data center and each candidate data center by a second coefficient, to obtain a sum value of the candidate data center, and determine a candidate data center corresponding to a maximum sum value of the sum value as the second data center.

With reference to the second aspect, in a third possible implementation, the capacity expansion module is further configured to create a virtual router in the second data center, create a subnet in the virtual router, connect the virtual machine to the subnet, and establish the network connection between the first data center and the virtual machine using the virtual router.

With reference to the second aspect, in a fourth possible implementation, the apparatus further includes a sending module configured to after the selection module selects the second data center from the at least one candidate data center and before the capacity expansion module creates, in the second data center, the virtual machine required for the capacity expansion of the application, send a resource reservation application to the second data center, where the resource reservation application includes a resource capacity of resources required for the capacity expansion, a resource attribute, and resource location information.

With reference to any one of the second aspect to the fourth possible implementation, in a fifth possible implementation, the apparatus further includes a back-migration module configured to, when the remaining resource capacity of the first data center exceeds a back-migration threshold of the application, create, in the first data center, a virtual machine required for a back-migration of the application, and register the virtual machine required for the back-migration of the application with the main control node of the application, and instruct the main control node of the application not to send service data to the virtual machine in the second data center any more, and delete the virtual machine from the second data center after determining that the virtual machine in the second data center has completed a task assigned by the main control node.

Based on the forgoing technical solutions, in the embodiments of the present disclosure, when it is determined that a load indicator of an application that runs in a first data center exceeds a capacity expansion threshold and a remaining resource capacity of the first data center is not greater than a resource capacity required for capacity expansion, a second data center is selected from at least one candidate data center, a virtual machine required for the capacity expansion of the application is created in the second data center, a network connection is established between the virtual machine and the first data center, and the virtual machine is registered with a main control node of the application such that the capacity expansion of the application is implemented in the second data center. In this way, capacity expansion of the application in the first data center can be performed by utilizing remaining resources of another data center, thereby improving resource utilization and capacity expansion efficiency.

DESCRIPTION OF EMBODIMENTS

To make the objectives, technical solutions, and advantages of the present disclosure clearer, the following further describes the present disclosure in detail with reference to the accompanying drawings. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
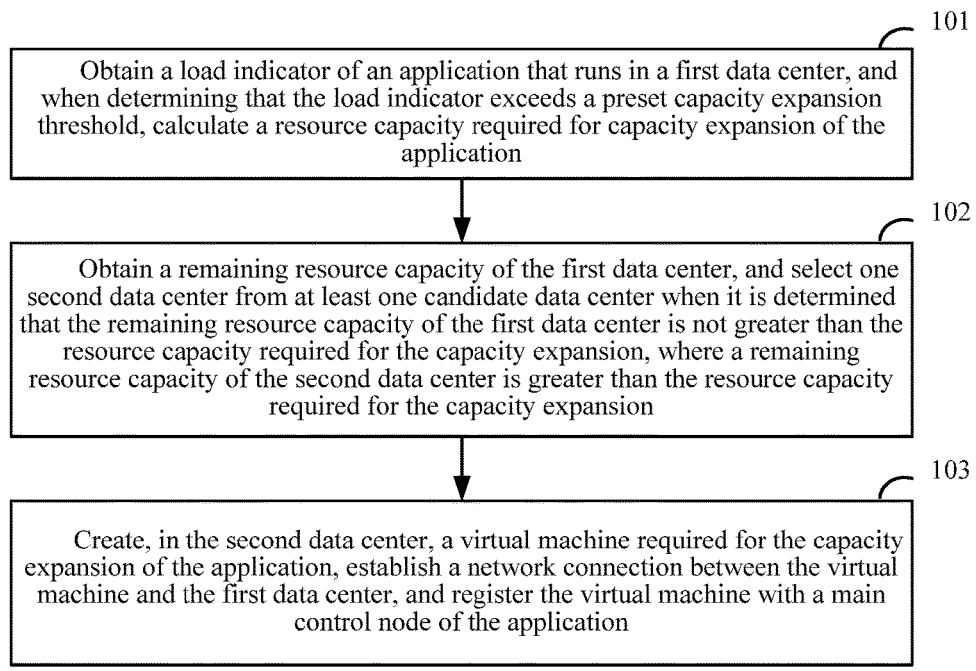
FIG. 1 is a schematic flowchart of an application scaling management method according to an embodiment of the present disclosure.

In an embodiment of the present disclosure, as shown in FIG. 1, a procedure of a detailed method for performing application scaling management is as follows.

Step 101: Obtain a load indicator of an application that runs in a first data center, and when determining that the load indicator exceeds a preset capacity expansion threshold, calculate a resource capacity required for capacity expansion of the application.

The load indicator of the application includes central processing unit (CPU) resources, memory resources, storage resources, and the like that are occupied by the application.

According to a capacity expansion policy of a scaling group of the application, a quantity of virtual machines required for the capacity expansion of the application and a hardware specification of the virtual machines are determined, and a required capacity of computing, storage, and network resources is calculated.

For example, the capacity expansion needs four virtual central processing units (VCPU), 4 gigabytes (GB) memory, 1 terabyte (TB) capacity storage, and two internal network internet protocol (IP) addresses.

Step 102: Obtain a remaining resource capacity of the first data center and select a second data center from at least one candidate data center when it is determined that the remaining resource capacity of the first data center is not greater than the resource capacity required for the capacity expansion, where a remaining resource capacity of the second data center is greater than the resource capacity required for the capacity expansion.

A candidate data center satisfies that the remaining resource capacity of the candidate data center is greater than the resource capacity required for the capacity expansion of the application in the first data center.

In an implementation, there are two cases of determining the second data center.

In a first case, when there is more than one candidate data center, in data centers other than the first data center, whose remaining resource capacity satisfies the resource capacity required for the capacity expansion of the application, a data center used for historical capacity expansion of the application is determined as the second data center when it is determined that the data center used for the historical capacity expansion exists in the at least one candidate data center. Alternatively, the second data center is selected from the at least one candidate data center according to a distance between the first data center and each candidate data center and network bandwidth between the first data center and each candidate data center if it is determined that no data center used for historical capacity expansion of the application exists in the at least one candidate data center.

In an implementation, the second data center is selected from the at least one candidate data center according to the distance between the first data center and each candidate data center and the network bandwidth between the first data center and each candidate data center when it is determined that no data center used for historical capacity expansion of the application exists in the at least one candidate data center.

In a second case, when there is one candidate data center, in data centers other than the first data center, whose remaining resource capacity satisfies the resource capacity required for the capacity expansion of the application, the candidate data center is used as the second data center.

In an implementation, selecting the second data center from the at least one candidate data center according to a distance between the first data center and each candidate data center and network bandwidth between the first data center and each candidate data center includes, for each candidate data center, adding up a first result that is obtained by multiplying the distance between the first data center and the candidate data center by a first coefficient and a second result that is obtained by multiplying the network bandwidth between the first data center and the candidate data center by a second coefficient, to obtain a sum value of the candidate data center, and selecting a maximum sum value from the sum value of the at least one candidate data center that is obtained through calculation, and determining a candidate data center corresponding to the maximum sum value as the second data center.

After the second data center is determined, a resource reservation application is sent to the second data center, where the resource reservation application includes a resource capacity of resources required for the capacity expansion, a resource attribute, and resource location information.

Step 103: Create, in the second data center, a virtual machine required for the capacity expansion of the application, establish a network connection between the virtual machine and the first data center, and register the virtual machine with a main control node of the application.

Establishing a network connection between the virtual machine that is created in the second data center and that is required for the capacity expansion of the application and the first data center includes creating a virtual router in the second data center, creating a subnet in the virtual router, connecting the virtual machine that is created in the second data center and that is required for the capacity expansion of the application to the subnet, and establishing, using the virtual router, the network connection between the first data center and the virtual machine that is created in the second data center and that is required for the capacity expansion of the application.

After the capacity expansion is performed on the second data center, a change status of remaining resources of the first data center is monitored in real time and, when the remaining resource capacity of the first data center exceeds a back-migration threshold of the application, a virtual machine required for a back-migration of the application is created in the first data center, the virtual machine required for the back-migration of the application is registered with the main control node of the application, the main control node of the application is instructed not to send service data to the virtual machine in the second data center any more, and the virtual machine is deleted from the second data center after it is determined that the virtual machine in the second data center has completed a task assigned by the main control node.

Figure 2:
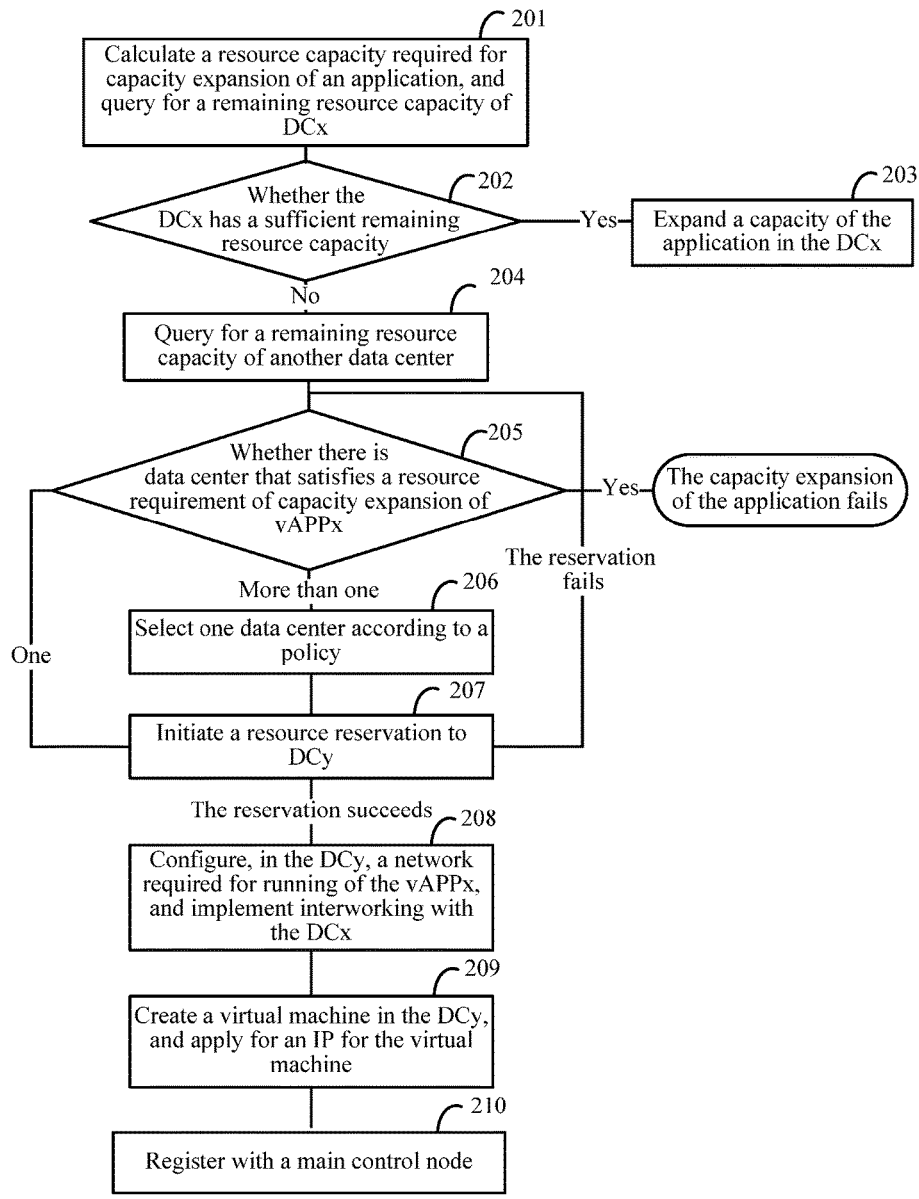
FIG. 2 is a schematic diagram of a capacity expansion process of an application according to an embodiment of the present disclosure.

A detailed process of performing capacity expansion of an application is described below using an embodiment. As shown in FIG. 2, when load of a virtual machine in a scaling group of an application increases and a monitored indicator exceeds a capacity expansion threshold, a specific capacity expansion process is as follows.

Step 201: Calculate, according to a capacity expansion policy of a scaling group of an application, a quantity of virtual machines required for capacity expansion, a hardware specification of the virtual machines, and a required capacity of computing, storage, and network resources.

Step 202: Query whether a remaining resource capacity of a data center DCx in which the application runs can satisfy a resource requirement of the capacity expansion of the application. When the remaining resource capacity of the data center DCx can satisfy the resource requirement, execute step 203; otherwise, execute step 204.

Step 203: Perform capacity expansion on the data center DCx in which the application runs.

Step 204: Separately calculate a remaining resource capacity of each data center other than the DCx and determine a data center whose computing, storage, and network resources can satisfy the requirement of the capacity expansion.

Step 205: When there is no other data center that satisfies the requirement of the capacity expansion of the application, the capacity expansion fails. When there is one other data center that satisfies the requirement of the capacity expansion of the application, execute step 207 Alternatively, when there is more than one other data center that satisfies the requirement of the capacity expansion of the application, execute step 206.

Step 206: When there is more than one other data center that satisfies the requirement of the capacity expansion of the application, select one data center according to the following policy, and identify the selected data center as DCy. Policy a: if capacity expansion has been previously performed for the application in a data center in the other data centers that satisfy the requirement of the capacity expansion of the application in step 206, select the data center; otherwise, select a data center according to policy b. Policy b: for each data center DCn of the other data centers that satisfy the requirement of the capacity expansion, calculate a sum value according to the following formula: (Distance between the DCx and the DCn×M)+(Network bandwidth between the DCx and the DCn×N), where M is a preset weight coefficient, and N is also a preset weight coefficient, and select a data center corresponding to a maximum value of the sum value as the DCy.

Step 207: Initiate a resource reservation application to the DCy. Content of the reservation application includes such information as a required capacity of computing, storage, and network resources, a resource quality level, and a resource location. After receiving the resource reservation application, the DCy reserve resources required for the capacity expansion of the application, and no other application other than the application is allowed to use the reserved resources.

Step 208: Create a network required by a virtual machine for the capacity expansion of the application using a northbound interface of the DCy to establish network interworking between the DCx and the DCy.

Figure 3:
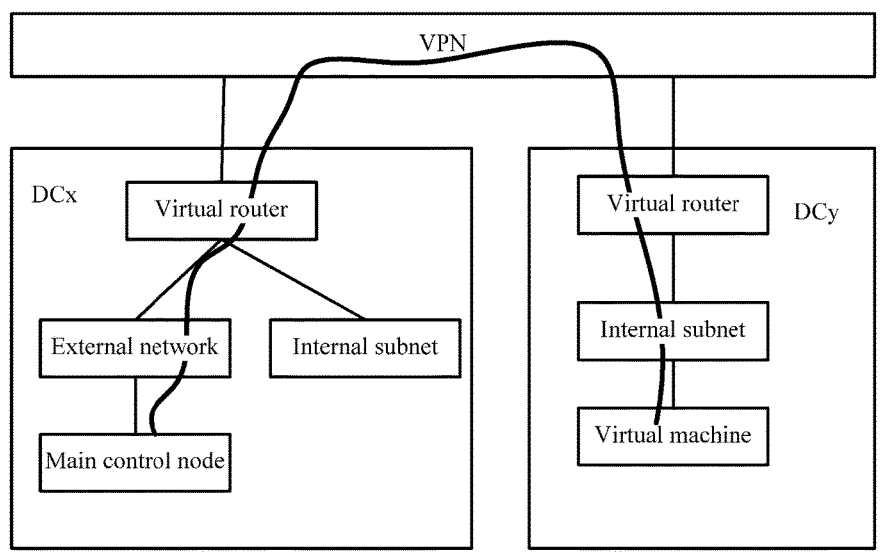
FIG. 3 is a schematic diagram of a communication path of a main control node and a virtual machine for capacity expansion according to an embodiment of the present disclosure.

If the DCy is a multi-tenant data center, because networks between tenants are isolated, at least one virtual router (vRouter) may be created for a tenant to which the application belongs so as to implement isolation from networks of other tenants in the data center DCy. In addition, a subnet may be created in the vRouter of the DCy, a virtual machine for capacity expansion of the application in the DCy is connected to the subnet, and the DCx and the vRouter of the DCy implement cross-data-center network communication using a virtual private network (VPN). A path of communication between a main control node and a virtual machine for capacity expansion using a VPN is shown in FIG. 3.

Step 209: Create a quantity of virtual machines with specifications required for the capacity expansion of the application using the northbound interface of the DCy, connect a network adapter of the virtual machine to the subnet created in the DCy for the application, and obtain an IP address from the subnet so as to have a capability of communicating with the virtual machine of the application in the DCx.

Step 210: Register the virtual machine created in step 209 with a main control node such that the main control node is notified that there is a newly added virtual machine in the scaling group and a service of the application can be sent to the newly added virtual machine for processing.

Figure 4:
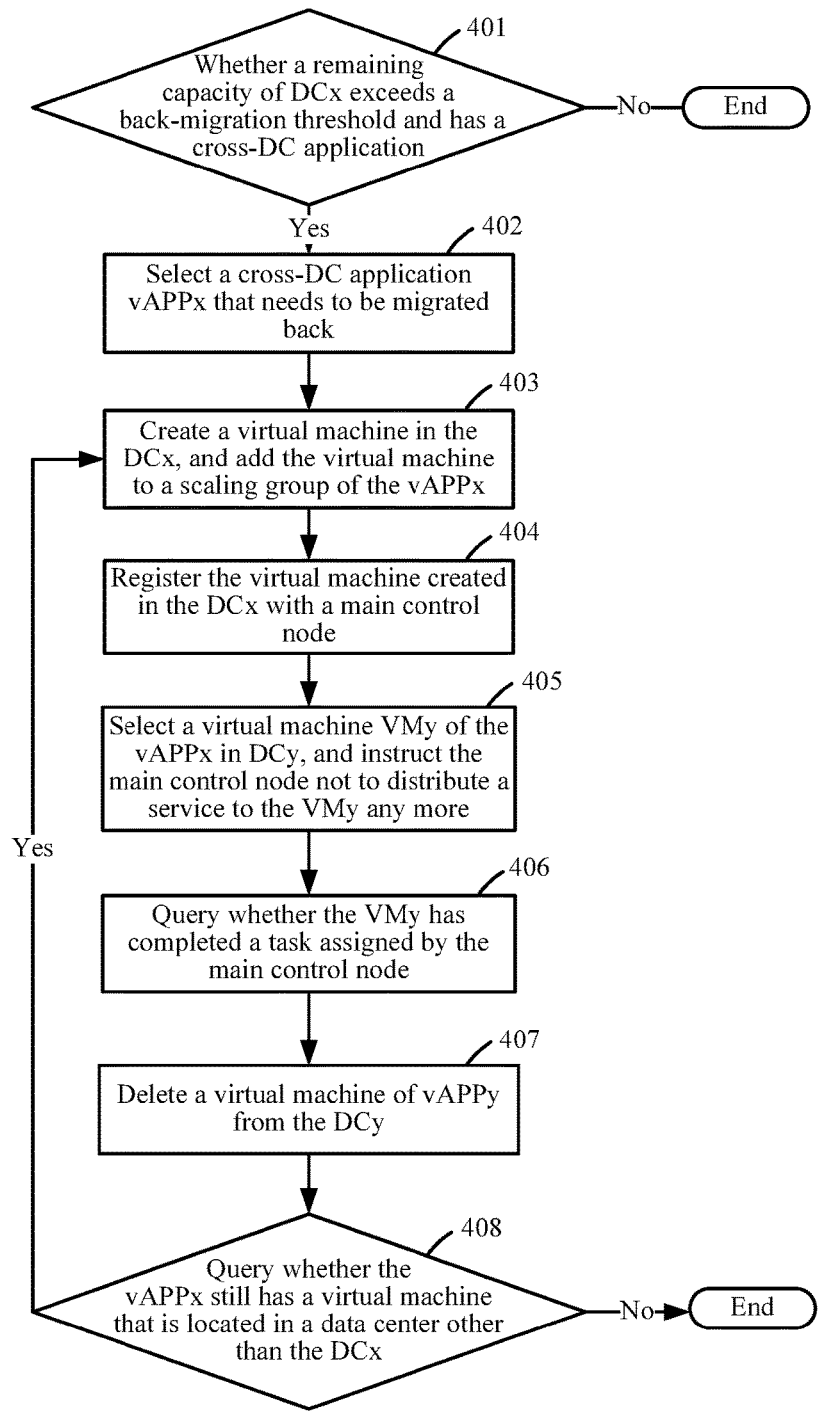
FIG. 4 is a schematic diagram of a back-migration process of a virtual machine according to an embodiment of the present disclosure.

The following describes, using another embodiment, that when remaining resources of a data center in which an application runs change and a remaining resource capacity reaches a preset back-migration threshold, a virtual machine of the application that runs in another data center can be migrated back. As shown in FIG. 4, a specific back-migration process is as follows.

Step 401: Collect information about a remaining resource capacity of DCx in real time, and if the remaining resource capacity of the DCx exceeds a back-migration threshold and there is a cross-data-center application in the DCx, continue to execute the back-migration step; otherwise, end the procedure.

Step 402: If there are a plurality of cross-data-center applications in the DCx, select an application (for example, an application identified as vAPPx) to perform a back-migration.

Step 403: Create, in the DCx, a virtual machine VMx for the application to be migrated back to and add the virtual machine to a scaling group of the application.

Step 404: Register the virtual machine VMx created in step 403 with a main control node of the vAPPx such that the virtual machine can receive a service distributed by the main control node.

Step 405: Select a virtual machine VMy of the vAPPx in another data center DCy, and instruct the main control node not to distribute a service to the VMy anymore.

Step 406: Query whether the VMy has completed the service distributed by the main control node. When the VMy has completed the service distributed by the main control node, execute step 407; otherwise, wait for a preset time length (n seconds) and continue to perform query.

Step 407: Delete the VMy from the DCy.

Step 408: Check whether the vAPPx still has a virtual machine that is located in a data center other than the DCx. When the vAPPx still has a virtual machine that is located in a data center other than the DCx, execute the back-migration procedure from step 403 to step 407; otherwise, end the procedure.

Figure 5:
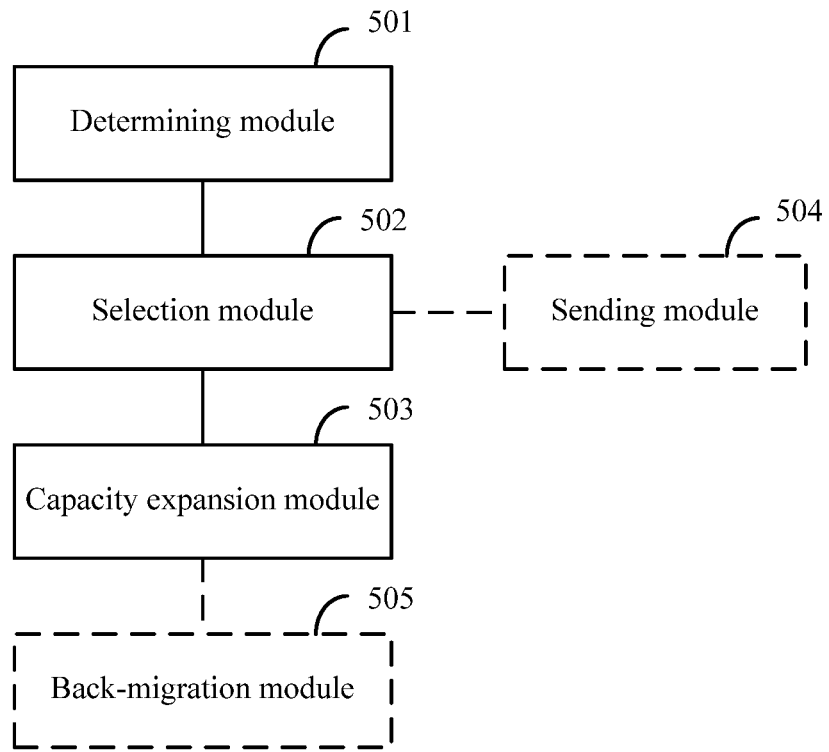
FIG. 5 is a schematic structural diagram of an application scaling management apparatus according to an embodiment of the present disclosure.

An embodiment of the present disclosure further provides an application scaling management apparatus. For details of an implementation of the apparatus, refer to the descriptions of the method embodiments which are not repeated again herein. As shown in FIG. 5, the apparatus includes a determining module 501 configured to obtain a load indicator of an application that runs in a first data center and, when determining that the load indicator exceeds a preset capacity expansion threshold, calculate a resource capacity required for capacity expansion of the application, a selection module 502 configured to obtain a remaining resource capacity of the first data center and select a second data center from at least one candidate data center when determining that the remaining resource capacity of the first data center is not greater than the resource capacity required for the capacity expansion, where a remaining resource capacity of the second data center is greater than the resource capacity required for the capacity expansion, and a capacity expansion module 503 configured to create, in the second data center, a virtual machine required for the capacity expansion of the application, establish a network connection between the virtual machine and the first data center, and register the virtual machine with a main control node of the application.

The selection module 502 is configured to determine a data center used for historical capacity expansion of the application as the second data center when determining that the data center used for the historical capacity expansion exists in the at least one candidate data center, or select the second data center from the at least one candidate data center according to a distance between the first data center and each candidate data center and network bandwidth between the first data center and each candidate data center.

Selecting, by the selection module 502, the second data center from the at least one candidate data center according to a distance between the first data center and each candidate data center and network bandwidth between the first data center and each candidate data center includes adding up a first result that is obtained by multiplying the distance between the first data center and each candidate data center by a first coefficient and a second result that is obtained by multiplying the network bandwidth between the first data center and each candidate data center by a second coefficient to obtain a sum value of the candidate data center, and determining a candidate data center corresponding to a maximum sum value of the sum value as the second data center.

The capacity expansion module 503 is configured to create a virtual router in the second data center, create a subnet in the virtual router, connect the virtual machine to the subnet, and establish the network connection between the first data center and the virtual machine using the virtual router.

A sending module 504 is further included and configured to, after the selection module selects the second data center from the at least one candidate data center and before the capacity expansion module creates the virtual machine required for the capacity expansion of the application in the second data center, send a resource reservation application to the second data center, where the resource reservation application includes a resource capacity of resources required for the capacity expansion, a resource attribute, and resource location information.

A back-migration module 505 is further included and configured to, after the capacity expansion performed by the capacity expansion module on the second data center succeeds, monitor a change in the remaining resource capacity of the first data center and, when the remaining resource capacity of the first data center exceeds a back-migration threshold of the application, create a virtual machine required for a back-migration of the application in the first data center and register the virtual machine required for the back-migration of the application with the main control node of the application. The back-migration module 505 may be further configured to instruct the main control node of the application not to send service data to the virtual machine in the second data center anymore and delete the virtual machine from the second data center after determining that the virtual machine in the second data center has completed a task assigned by the main control node.

Figure 6:
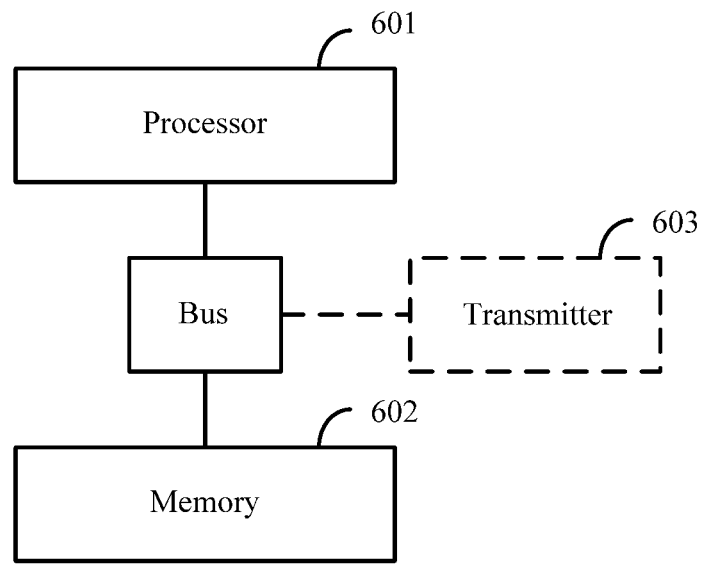
FIG. 6 is a schematic structural diagram of an application scaling management device according to an embodiment of the present disclosure.

An embodiment of the present disclosure further provides an application scaling management device. For a specific implementation of the device, refer to the descriptions of the method embodiments which are not repeated again herein. As shown in FIG. 6, the device includes a processor 601 and a memory 602 that are connected using a bus. The processor 601 is configured to read a program in the memory 602 and execute steps according to the program. The steps may include obtaining a load indicator of an application that runs in a first data center, and when determining that the load indicator exceeds a preset capacity expansion threshold, calculating a resource capacity required for capacity expansion of the application, obtaining a remaining resource capacity of the first data center, and selecting a second data center from at least one candidate data center when determining that the remaining resource capacity of the first data center is not greater than the resource capacity required for the capacity expansion, where a remaining resource capacity of the second data center is greater than the resource capacity required for the capacity expansion, and creating, in the second data center, a virtual machine required for the capacity expansion of the application, establishing a network connection between the virtual machine and the first data center, and registering the virtual machine with a main control node of the application.

Selecting, by the processor 601, a second data center from the at least one candidate data center includes determining a data center used for historical capacity expansion of the application as the second data center when determining that the data center used for the historical capacity expansion exists in the at least one candidate data center, or selecting the second data center from the at least one candidate data center according to a distance between the first data center and each candidate data center and network bandwidth between the first data center and each candidate data center.

In an implementation, the selecting, by the processor 601, the second data center from the at least one candidate data center according to a distance between the first data center and each candidate data center and network bandwidth between the first data center and each candidate data center includes adding up a first result that is obtained by multiplying the distance between the first data center and each candidate data center by a first coefficient and a second result that is obtained by multiplying the network bandwidth between the first data center and each candidate data center by a second coefficient, to obtain a sum value of the candidate data center and determining a candidate data center corresponding to a maximum sum value of the sum value as the second data center.

Establishing, by the processor 601, a network connection between the virtual machine that is created in the second data center and that is required for the capacity expansion of the application and the first data center includes creating a virtual router in the second data center, creating a subnet in the virtual router, connecting the virtual machine to the subnet, and establishing the network connection between the first data center and the virtual machine using the virtual router.

A transmitter 603 is further included and configured to send a resource reservation application to the second data center, where the resource reservation application includes a resource capacity of resources required for the capacity expansion, a resource attribute, and resource location information.

After the capacity expansion performed on the second data center succeeds, the processor 601 monitors a change in the remaining resource capacity of the first data center. When the remaining resource capacity of the first data center exceeds a back-migration threshold of the application, the processor 601 creates, in the first data center, a virtual machine required for a back-migration of the application and registers the virtual machine required for the back-migration of the application with the main control node of the application The processor 601 further instructs the main control node of the application not to send service data to the virtual machine in the second data center anymore and deletes the virtual machine from the second data center after determining that the virtual machine in the second data center has completed a task assigned by the main control node.

Based on the forgoing technical solutions, in the embodiments of the present disclosure, when it is determined that a load indicator of an application that runs in a first data center exceeds a capacity expansion threshold and a remaining resource capacity of the first data center is not greater than a resource capacity required for capacity expansion, a second data center is selected from at least one candidate data center, a virtual machine required for the capacity expansion of the application is created in the second data center, a network connection is established between the virtual machine and the first data center, and the virtual machine is registered with a main control node of the application such that the capacity expansion of the application is implemented in the second data center. In this way, capacity expansion of the application in the first data center can be performed by utilizing remaining resources of another data center, thereby improving resource utilization and capacity expansion efficiency.

A person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. An application scaling management method, comprising:
   obtaining a load indicator of an application that runs in a first data center;
   calculating a resource capacity required for capacity expansion of the application when the load indicator exceeds a preset capacity expansion threshold;
   obtaining a remaining resource capacity of the first data center;
   selecting a second data center from at least one candidate data center when the remaining resource capacity of the first data center is not greater than the resource capacity required for the capacity expansion, a remaining resource capacity of the second data center being greater than the resource capacity required for the capacity expansion, and selecting the second data center from the at least one candidate data center comprising selecting the second data center from the at least one candidate data center according to a distance between the first data center and each candidate data center and network bandwidth between the first data center and each candidate data center by:
      adding up a first result that is obtained by multiplying the distance between the first data center and each candidate data center by a first coefficient and a second result that is obtained by multiplying the network bandwidth between the first data center and each candidate data center by a second coefficient to obtain a sum value of the candidate data center; and
      determining a candidate data center corresponding to a maximum sum value of the obtained sum values as the second data center;
   creating, in the second data center, a virtual machine required for the capacity expansion of the application;
   establishing a network connection between the virtual machine and the first data center; and
   registering the virtual machine with a main control node of the application.

2. The method of claim 1, wherein selecting the second data center from the at least one candidate data center further comprises determining a data center used for historical capacity expansion of the application as the second data center when the data center used for the historical capacity expansion exists in the at least one candidate data center.

3. The method of claim 1, wherein establishing the network connection between the virtual machine and the first data center comprises
   creating a virtual router in the second data center;
   creating a subnet in the virtual router;
   connecting the virtual machine to the subnet; and
   establishing the network connection between the first data center and the virtual machine using the virtual router.

4. The method of claim 1, wherein after selecting the second data center from the at least one candidate data center and before creating, in the second data center, the virtual machine required for the capacity expansion of the application, the method further comprises sending a resource reservation application to the second data center, the resource reservation application comprising a resource capacity of resources required for the capacity expansion, a resource attribute, and resource location information.

5. The method of claim 1, further comprising:
   creating, in the first data center, a virtual machine required for a back-migration of the application when the remaining resource capacity of the first data center exceeds a back migration threshold of the application;
   registering the virtual machine required for the back-migration of the application with the main control node of the application;
   instructing the main control node of the application not to send service data to the virtual machine in the second data center anymore; and
   deleting the virtual machine from the second data center after the virtual machine in the second data center has completed a task assigned by the main control node.

6. The method of claim 1, wherein the resource capacity required for capacity expansion of the application comprises central processing unit resources.

7. The method of claim 1, wherein the resource capacity required for capacity expansion of the application comprises storage resources.

8. The method of claim 1, wherein the resource capacity required for capacity expansion of the application comprises memory resources.

9. The method of claim 1, wherein the resource capacity required for capacity expansion of the application comprises internal network Internet Protocol (IP) address resources.

10. The method of claim 1, wherein the second data center comprises a multi-tenant data center.

11. An application scaling management apparatus, comprising:
    a processor; and
    a memory coupled to the processor and comprising a plurality of instructions stored therein that when executed by the processor, cause the processor to:
       obtain a load indicator of an application that runs in a first data center;
       calculate a resource capacity required for capacity expansion of the application when the load indicator exceeds a preset capacity expansion threshold;
       obtain a remaining resource capacity of the first data center;
       select a second data center from at least one candidate data center when the remaining resource capacity of the first data center is not greater than the resource capacity required for the capacity expansion, a remaining resource capacity of the second data center being greater than the resource capacity required for the capacity expansion, and select the second data center from the at least one candidate data center according to a distance between the first data center and each candidate data center and network bandwidth between the first data center and each candidate data center by:
adding a first result that is obtained by multiplying the distance, between the first data center and each candidate data center by a first coefficient and a second result that is obtained by multiplying the network bandwidth between the first data center and each candidate data center by a second coefficient to obtain a sum value of the candidate data center; and
determining a candidate data center corresponding to a maximum sum value of the obtained sum values as the second data center;
create, in the second data center, a virtual machine required for the capacity expansion of the application;
establish a network connection between the virtual machine and the first data center; and
register the virtual machine with a main control node of the application.

12. The apparatus of claim 11, wherein the instructions further cause the processor to determine a data center used for historical capacity expansion of the application as the second data center when the data center used for the historical capacity expansion exists in the at least one candidate data center.

13. The apparatus of claim 11, wherein the instructions further cause the processor to:
create a virtual router in the second data center;
create a subnet in the virtual router;
connect the virtual machine to the subnet; and
establish the network connection between the first data center and the virtual machine using the virtual router.

14. The apparatus of claim 11, wherein the instructions further cause the processor to send a resource reservation application to the second data center, the resource reservation application comprising a resource capacity of resources required for the capacity expansion, a resource attribute, and resource location information.

15. The apparatus according to claim 11, wherein the instructions further cause the processor to:
create, in the first data center, a virtual machine required for a back-migration of the application when the remaining resource capacity of the first data center exceeds a back-migration threshold of the application;
register the virtual machine required for the back-migration of the application with the main control node of the application;
instruct the main control node of the application not to send service data to the virtual machine in the second data center anymore; and
delete the virtual machine from the second data center after the virtual machine in the second data center has completed a task assigned by the main control node.

16. The apparatus of claim 11, wherein the resource capacity required for capacity expansion of the application comprises central processing unit resources.

17. The apparatus of claim 11, wherein the resource capacity required for capacity expansion of the application comprises storage resources.

18. The apparatus of claim 11, wherein the resource capacity required for capacity expansion of the application comprises memory resources.

19. The apparatus of claim 11, wherein the resource capacity required for capacity expansion of the application comprises internal network Internet Protocol (IP) address resources.

20. The apparatus of claim 11, wherein the second data center comprises a multi-tenant data center.

* * * * *